United States Patent
Kita et al.

(10) Patent No.: US 12,500,454 B2
(45) Date of Patent: Dec. 16, 2025

(54) DEVICE POWER SUPPLY SYSTEM

(71) Applicants: TOYODA GOSEI CO., LTD., Kiyosu (JP); TOYOTA HOUSING CORPORATION, Nagoya (JP)

(72) Inventors: Kazuhiro Kita, Aichi (JP); Yuki Tokuyama, Aichi (JP); Kazuhito Kawamura, Aichi (JP); Taku Koike, Aichi (JP); Hiroki Kanemoto, Aichi (JP)

(73) Assignees: TOYODA GOSEI CO., LTD., Aichi-pref. (JP); TOYOTA HOUSING CORPORATION, Nagoya (JP)

( * ) Notice: Subject to any disclaimer, the term of this patent is extended or adjusted under 35 U.S.C. 154(b) by 17 days.

(21) Appl. No.: 18/602,391

(22) Filed: Mar. 12, 2024

(65) Prior Publication Data
US 2024/0313581 A1 Sep. 19, 2024

(30) Foreign Application Priority Data
Mar. 13, 2023 (JP) ................................ 2023-038902

(51) Int. Cl.
*H02J 50/20* (2016.01)
*E04F 19/08* (2006.01)
*H02J 50/70* (2016.01)

(52) U.S. Cl.
CPC .............. *H02J 50/20* (2016.02); *E04F 19/08* (2013.01); *H02J 50/70* (2016.02)

(58) Field of Classification Search
CPC .. H02J 50/20; H02J 50/70; H02J 50/40; H02J 50/90; E04F 19/08
See application file for complete search history.

(56) References Cited

U.S. PATENT DOCUMENTS

| 2020/0295598 | A1 | 9/2020 | Zeine | |
|---|---|---|---|---|
| 2021/0351616 | A1 | 11/2021 | Zeine | |
| 2022/0123599 | A1* | 4/2022 | Sone | H02J 50/005 |
| 2023/0399846 | A1* | 12/2023 | Chang | H02J 9/06 |

FOREIGN PATENT DOCUMENTS

| JP | 2020-124084 A | 8/2020 |
|---|---|---|
| JP | 2021-153369 A | 9/2021 |
| JP | 2022-525877 A | 5/2022 |

* cited by examiner

*Primary Examiner* — Lincoln D Donovan
*Assistant Examiner* — Alex W Lam
(74) *Attorney, Agent, or Firm* — Posz Law Group, PLC

(57) ABSTRACT

A device power supply system is applied to a building including a recessed space that is formed to be recessed with respect to a wall surface of a living space and is opened toward the living space and is for supplying electric power to a device. The device power supply system includes: a device arrangement portion that is provided in the recessed space and in which the device is to be disposed; and a power transmitter that transmits electric power to be supplied to the device disposed in the device arrangement portion as microwaves, and the power transmitter is disposed on a peripheral portion of the recessed space or at an inner side of the peripheral portion, and a transmission direction of the microwaves is set to a direction intersecting a depth direction of the recessed space.

14 Claims, 7 Drawing Sheets

DEVICE POWER SUPPLY SYSTEM

CROSS-REFERENCE TO RELATED APPLICATION

This application is based on and claims priority under 35 USC 119 from Japanese Patent Application No. 2023-038902 filed on Mar. 13, 2023.

TECHNICAL FIELD

The present invention relates to a device power supply system.

BACKGROUND ART

JP2020-124084A discloses a power supply device that supplies electric power to an electronic device such as a mobile phone or a smartphone. The power supply device includes an accommodation portion that is mounted in a vehicle and can accommodate the electronic device, and a power transmitter that is disposed inside the accommodation portion and transmits microwaves to the electronic device. According to the power supply device, the microwaves transmitted from the power transmitter are received by a power receiving unit provided in the electronic device and converted into electric power. Therefore, the electric power can be supplied to the electronic device by microwave power transmission.

Further, in the power supply device of JP2020-124084A, a lid portion that can be opened and closed is provided in the accommodation portion. When electric power is supplied to the electronic device, first, the lid portion is opened and the electronic device is placed in the accommodation portion, and then the lid portion is closed and the microwave power transmission to the electronic device is performed by the power transmitter. In this case, it is possible to suppress leakage of microwaves from the accommodation portion during power transmission.

SUMMARY OF INVENTION

Here, it is conceivable to install the power supply device of JP2020-124084A in a building and supply electric power to the electronic device using the power supply device. However, as described above, the power supply device of JP2020-124084A is troublesome because it is necessary to open and close the lid portion when the electronic device is accommodated in the accommodation portion and supplied with electric power.

Further, it is conceivable not to provide the lid portion in the power supply device, but in this case, there is a risk that the microwaves leak from the accommodation portion to a living space during the power transmission.

The present invention has been made in view of the above circumstances, and a main object thereof is to provide a device power supply system capable of suppressing leakage of microwaves to a living space while improving convenience in supplying electric power to a device by microwave power transmission in a building.

To achieve the object, a device power supply system of a first aspect of the invention is a device power supply system that is applied to a building including a recessed space that is formed to be recessed with respect to a wall surface of a living space and is opened toward the living space and is for supplying electric power to a device, the device power supply system including: a device arrangement portion that is provided in the recessed space and in which the device is to be disposed; and a power transmitter configured to transmit electric power to be supplied to the device disposed in the device arrangement portion as microwaves, wherein the power transmitter is disposed on a peripheral portion of the recessed space or at an inner side of the peripheral portion, and a transmission direction of the microwaves is set to a direction intersecting a depth direction of the recessed space.

According to the first aspect of the invention, the device arrangement portion on which the device which is a power supply target is disposed is provided in the recessed space that is formed by being recessed with respect to the wall surface of the living space and opened in the living space. In this case, since it is not necessary to open or close the door or the like when disposing the device on the device arrangement portion, it is possible to improve convenience in supplying electric power to the device.

The electric power to be supplied to the device disposed on the device arrangement portion is transmitted as microwaves from the power transmitter. The power transmitter is disposed on a peripheral portion of the recessed space or an inner side thereof, and the transmission direction of the microwaves is set to the direction intersecting the depth direction of the recessed space. In this case, it is possible to suppress the leakage of the microwaves transmitted from the power transmitter to the living space from an open portion of the recessed space. Accordingly, it is possible to suppress the leakage of the microwaves to the living space while improving convenience in supplying the electric power to the device by the microwave power transmission in the building.

A device power supply system of a second aspect of the invention is the device power supply system according to the first aspect, further including: a power receiver disposed on a peripheral portion of the recessed space or at an inner side of the peripheral portion, and configured to receive microwaves transmitted from the power transmitter, wherein the power receiver has a function of converting the received microwaves into electric power and supplying the electric power to the device.

According to the second aspect, the microwaves transmitted from the power transmitter are received by the power receiver. Then, the received microwaves are converted into the electric power by the power receiver and supplied to the device. In this case, the electric power can be supplied to the device even if the device which is a power supply target does not include a power receiving unit that receives the microwaves. Therefore, a highly versatile power supply system can be obtained.

A device power supply system of a third aspect of the invention is the device power supply system according to the second aspect, wherein the power transmitter and the power receiver are disposed to face each other in an upper-lower direction with the power transmitter as an upper side and the power receiver as a lower side, an upper surface of the power receiver serves as the device arrangement portion on which the device is placed, and the power receiver includes a power supplier configured to supply electric power to the device placed on the upper surface by non-contact power supply.

According to the third aspect, electric power can be supplied to the device only by placing the device on the upper surface of the power receiver. Therefore, it is possible to further improve convenience when the electric power is supplied to the device.

A device power supply system of a fourth aspect of the invention is the device power supply system according to the third aspect, wherein the power receiver includes a power storage configured to store electric power converted from the microwaves, the power supplier is capable of supplying the electric power stored in the power storage to the device, and the power receiver is provided so as to be able to be taken out from the recessed space.

According to the fourth aspect, the power receiver includes the power storage unit that stores the electric power converted from the microwaves, and the power receiver is provided so as to be able to be taken out from the recessed space. In this case, the power receiver can be taken out from the recessed space, and the electric power stored in the power storage unit can be supplied to the device at a take-out destination. Accordingly, the electric power can be supplied to the device while the device is kept at hand, and thus the convenience can be further improved.

A device power supply system of a fifth aspect of the invention is the device power supply system according to the third aspect or the fourth aspect, wherein the power transmitter is provided on an upper surface of the recessed space, the power receiver is provided on a lower surface of the recessed space, the lower surface of the recessed space is located above a floor surface of the living space, and the upper surface of the recessed space is located below a ceiling surface of the living space.

According to the fifth aspect, the power transmitter and the power receiver can be easily provided using the upper surface and the lower surface of the recessed space. Further, since the lower surface of the recessed space is above the floor surface of the living space and the upper surface of the recessed space is below the ceiling surface of the living space, an upper-lower dimension of the recessed space is reduced. In this case, since an upper-lower distance between the power transmitter and the power receiver facing each other in the upper-lower direction can be shortened, the amount of microwaves transmitted from the power transmitter to the power receiver can be increased, and thus the amount of microwaves transmitted to the device can be increased.

A device power supply system of a sixth aspect of the invention is the device power supply system according to any one of the first to fourth aspects, wherein the transmission direction of the microwaves transmitted from the power transmitter is a direction toward a back side of the recessed space as the transmission direction approaches a transmission destination side.

According to the sixth invention, it is possible to further suppress the leakage of the microwaves to the living space from the open portion of the recessed space.

DETAILED DESCRIPTION OF THE INVENTION

Figure 1:
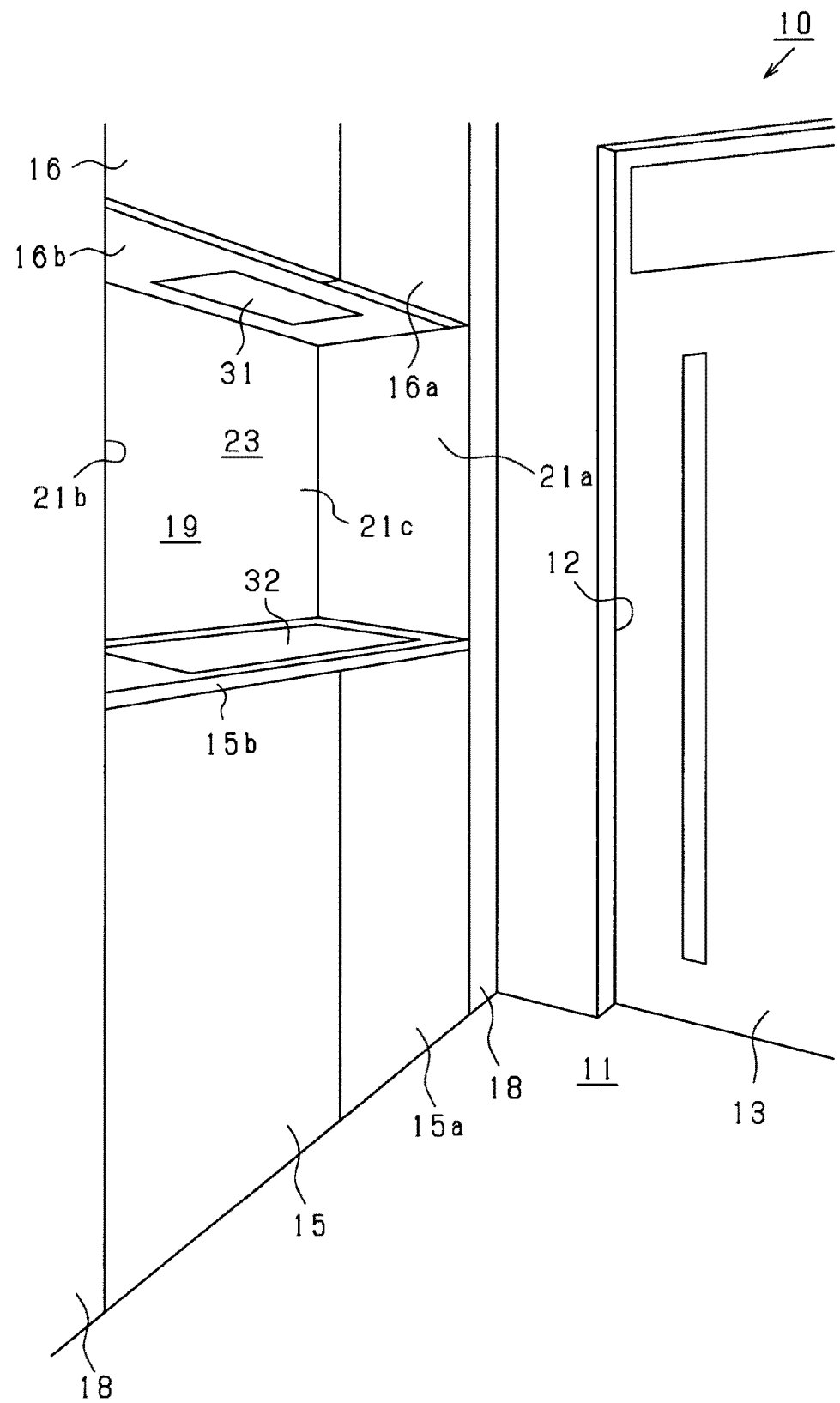
FIG. 1 is a perspective view showing a periphery of an entrance.

Hereinafter, an embodiment of the present invention will be described with reference to the drawings. FIG. 1 is a perspective view showing a periphery of an entrance.

As shown in FIG. 1, an entrance 11 is provided in a building 10 such as a house. The entrance 11 is provided with an gateway 12, and the gateway 12 is provided with an entrance door 13. The entrance 11 corresponds to a "living space". In the present specification, the living space is a space in which a person operates, and includes a living room, a bedroom, a kitchen, the entrance, a bathroom, a toilet, a washroom, a corridor, and the like.

Storage shelves 15, 16 capable of storing objects are installed beside the entrance 11. The storage shelves 15, 16 are installed in a recessed space 19 formed by being recessed with respect to a wall surface 18 of the entrance 11. The space 19 is a vertically long space extending in an upper-lower direction from a floor surface to a ceiling surface of the entrance 11, and is opened toward the entrance 11. Three sides of the space 19 are surrounded by wall portions 21a to 21c. Among the wall portions 21a to 21c, the wall portions 21a, 21b are disposed on both sides of the space 19, and the wall portion 21c is disposed at the back of the space 19.

In the space 19, a lower storage shelf 15 is installed on a lower side, and an upper storage shelf 16 is installed on an upper side. Each of the storage shelves 15, 16 is a box-shaped storage shelf, and has double opening-type door portions 15a, 16a. The lower storage shelf 15 is installed on a floor surface of the space 19, and the upper storage shelf 16 is attached to a ceiling surface or the like of the space 19. Further, each of the storage shelves 15, 16 is disposed across the wall portions 21a, 21b.

The lower storage shelf 15 and the upper storage shelf 16 are disposed apart from each other in the upper-lower direction. A recessed space 23 recessed with respect to the wall surface 18 of the entrance 11 is formed between the lower storage shelf 15 and the upper storage shelf 16. The recessed space 23 is open toward the entrance 11. Specifically, an open portion of the recessed space 23 is not provided with an opening and closing body such as a door for opening and closing the open portion. Therefore, the recessed space 23 is always kept open toward the entrance 11.

The recessed space 23 has a lower surface formed by a top plate portion 15b of the lower storage shelf 15 and an upper surface formed by a bottom plate portion 16b of the upper storage shelf 16. Further, side surfaces of the recessed space 23 is formed by the wall portions 21a, 21b, respectively, and a back surface (rear surface) thereof is formed by the wall portion 21c. Accordingly, the recessed space 23 is a space in which only one surface (front surface) is opened. A dimension of the recessed space 23 in the upper-lower direction is less than or equal to half a dimension of the entrance 11 in the upper-lower direction (an upper-lower dimension from the floor surface of the entrance 11 to the ceiling surface of the entrance 11).

Figure 2:
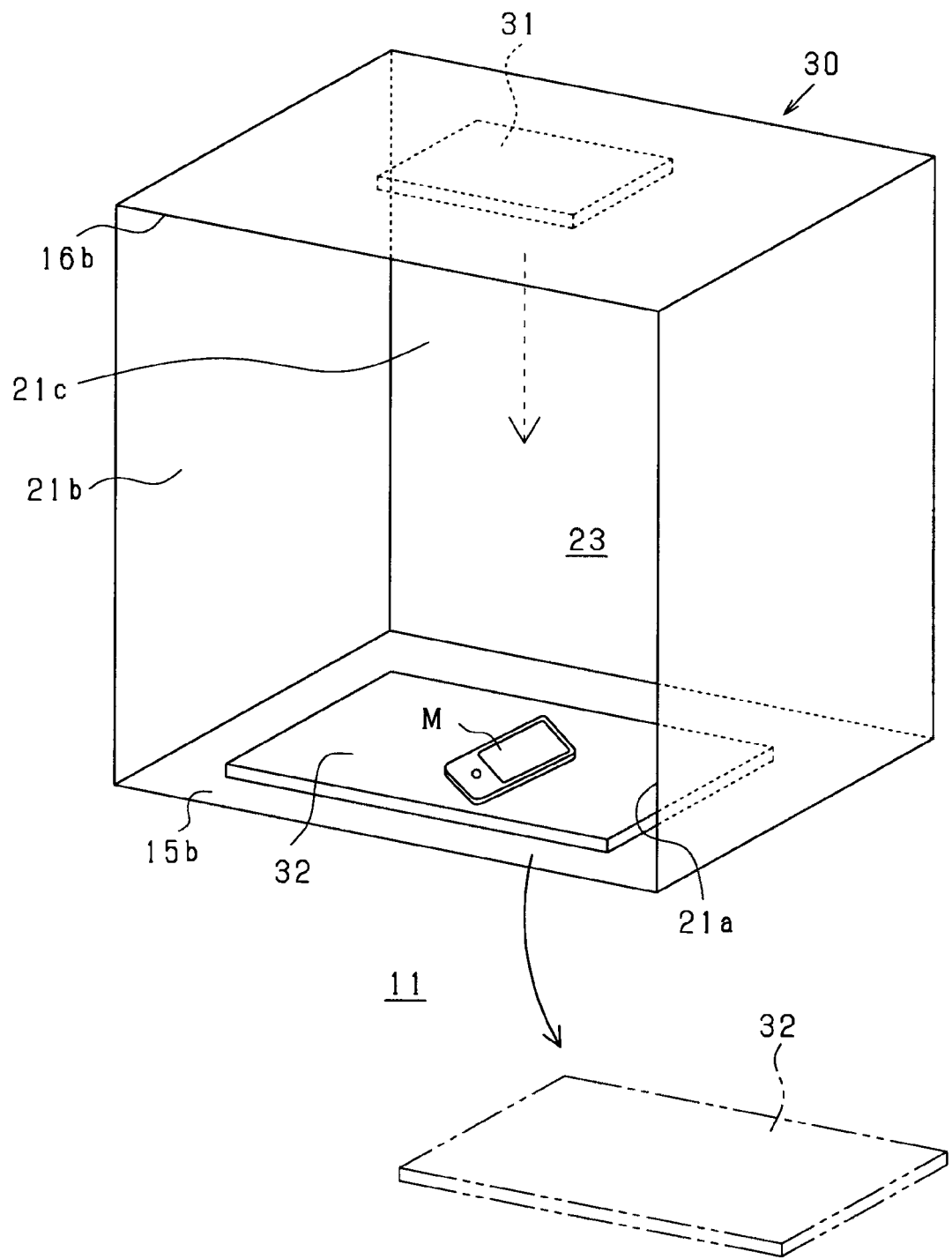
FIG. 2 is a schematic perspective view showing an arrangement state of a power transmitter and a power receiver constituting a device power supply system.
Figure 3:
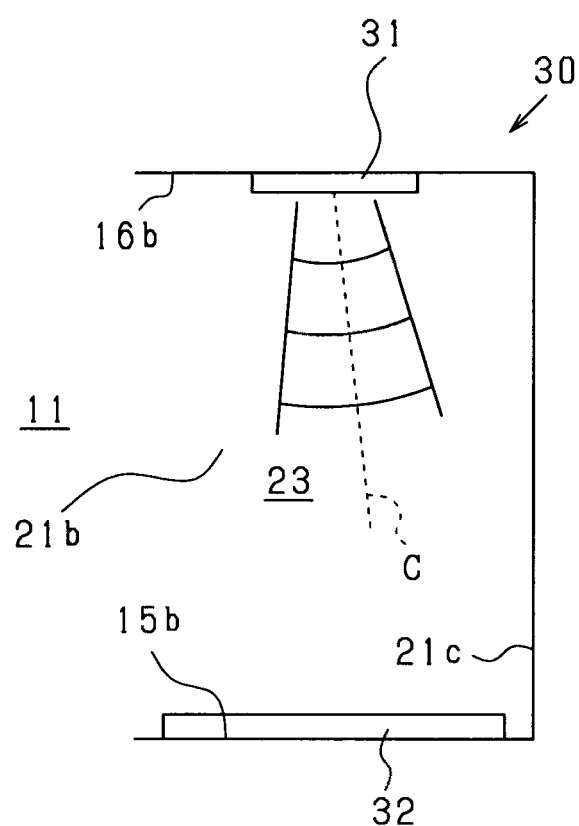
FIG. 3 is a schematic side view showing the arrangement state of the power transmitter and the power receiver.

Here, the building 10 of the present embodiment is provided with a device power supply system 30 that supplies electric power to a device using the recessed space 23 opened in the entrance 11. Hereinafter, a configuration of the device power supply system 30 will be described with reference to FIG. 2. FIG. 2 is a schematic perspective view showing an arrangement state of the power transmitter 31 and the power receiver 32 constituting the device power supply system 30. FIG. 3 is a schematic side view showing the arrangement state of the power transmitter 31 and the power receiver 32. In FIGS. 2 and 3, the recessed space 23 is simplified.

As shown in FIGS. 2 and 3, a power transmitter 31 that transmits microwaves and a power receiver 32 that receives microwaves transmitted from the power transmitter 31 are provided in a peripheral portion of the recessed space 23. The power transmitter 31 is formed in a rectangular plate shape, and is attached to a lower surface of the bottom plate portion 16b of the upper storage shelf 16 (in other words, the upper surface of the recessed space 23). The power transmitter 31 includes a power transmission antenna (not shown) that transmits microwaves. The power transmitter 31 may be provided on an upper surface of the bottom plate portion 16b.

The power receiver 32 is formed in a rectangular plate shape (rectangular flat plate shape), and is placed on an upper surface of the top plate portion 15b of the lower storage shelf 15 (in other words, the lower surface of the recessed space 23). In this case, the power transmitter 31 and the power receiver 32 are disposed to face each other in the upper-lower direction.

The power transmitter 31 transmits the microwaves to the power receiver 32. In this case, a transmission direction of the microwaves by the power transmitter 31 is the upper-lower direction. Accordingly, the transmission direction of the microwaves intersects a depth direction of the recessed space 23. Further, the transmission direction of the microwaves is a direction inclined with respect to a vertical direction, and specifically, is a direction toward a back side of the recessed space 23 as the transmission direction approaches a transmission destination side (that is, a lower side) of the microwaves (see FIG. 3).

As shown in FIG. 3, the microwaves have diffusibility and spread at a predetermined diffusion angle as the microwaves are away from the power transmitter 31. Therefore, in the present specification, the transmission direction of the microwaves described above is defined as an extending direction of a center line C of the diffused microwaves.

A device M which is a power supply target is placed on an upper surface of the power receiver 32. In the example of FIG. 2, a portable device carried by the user is placed as the device M, and specifically, a smartphone is placed. In this case, the upper surface of the power receiver 32 corresponds to a device arrangement portion. The power receiver 32 has a function of converting the microwaves transmitted from the power transmitter 31 into electric power and supplying the electric power to the device M. Accordingly, the electric power is supplied to the device M, and the device M is charged.

Each of the wall portions 21a to 21c includes a blocking layer (not shown) that blocks the microwaves. The blocking layer is included in, for example, wallpaper forming wall surfaces of the wall portions 21a to 21c. In this case, the recessed space 23 is surrounded in a U-shape by the blocking layer of each of the wall portions 21a to 21c.

Figure 4A:
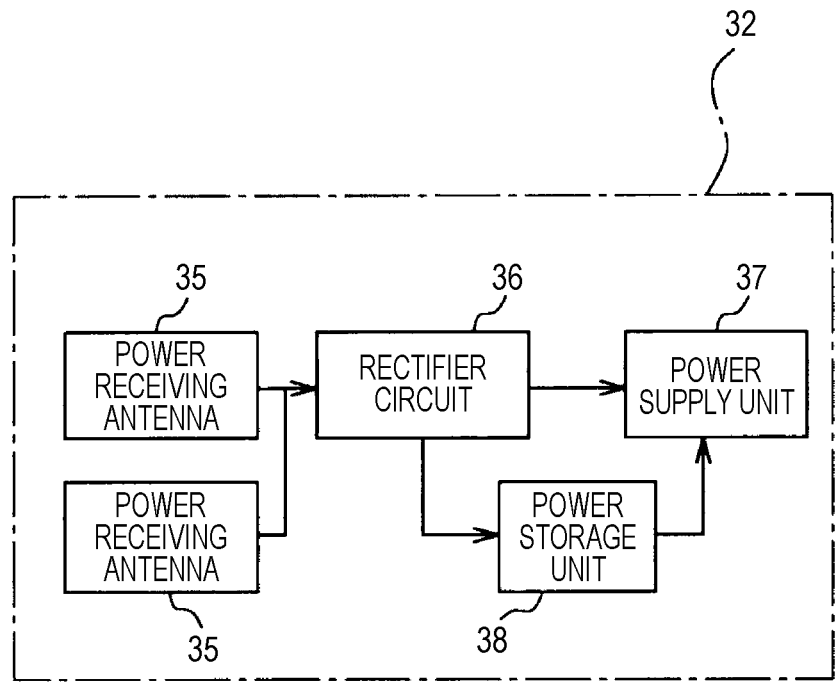
FIG. 4A is a diagram showing an electrical configuration of the power receiver.
Figure 4B:
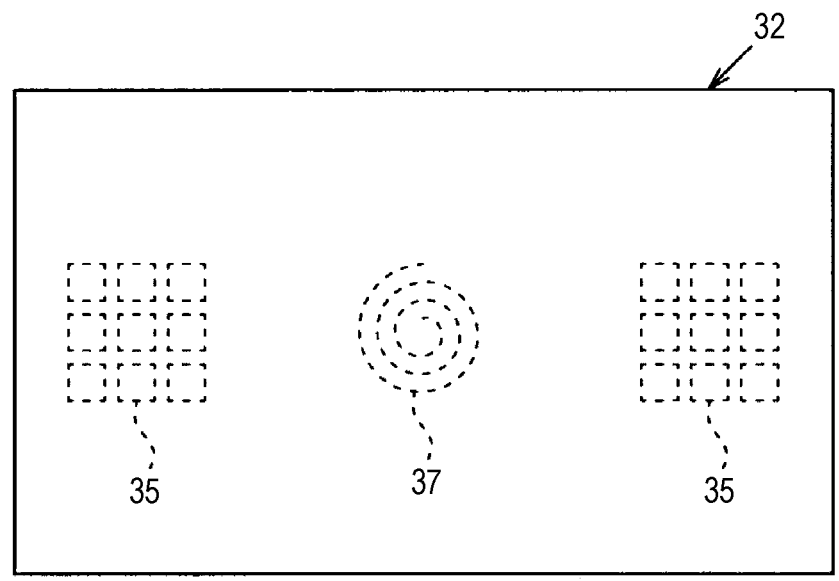
FIG. 4B is a plan view showing the power receiver.

Next, a configuration of the power receiver 32 will be described with reference to FIG. 4. FIG. 4A is a diagram showing an electrical configuration of the power receiver 32, and FIG. 4B is a plan view showing the power receiver 32.

As shown in FIG. 4A, the power receiver 32 includes power receiving antennae 35, a rectifier circuit 36, a power supply unit 37, and a power storage unit 38. All of these units 35 to 38 are incorporated in the power receiver 32. The power receiving antenna 35 receives microwaves transmitted from the power transmitter 31. The power receiving antenna 35 is an antenna group in which microstrip antennae (patch antennae) are arranged, and a plurality of (specifically, two) power receiving antennae 35 are provided in the power receiver 32. The power receiving antennae 35 are disposed on both left and right sides of the power receiver 32 (see FIG. 4B).

Each power receiving antenna 35 is connected to the rectifier circuit 36. The rectifier circuit 36 converts microwaves received by the power receiving antennae 35 into electric power (specifically, DC power). The rectifier circuit 36 is connected to the power supply unit 37 and the power storage unit 38.

The power supply unit 37 supplies the electric power converted by the rectifier circuit 36 to the device M. The power supply unit 37 performs non-contact power supply (wireless power supply) to the device M, and includes a power transmission coil. The power supply unit 37 is disposed in a central portion of the power receiver 32 and is located between the power receiving antennae 35 (see FIG. 4B). The device M is disposed on the upper surface of the power receiver 32, for example, at a position directly above the power supply unit 37. The power supply unit 37 performs non-contact power supply by electromagnetic induction from the power transmission coil to a power reception coil incorporated in the device M in an arrangement state of the device M. A magnet may be incorporated in the power receiver 32, and the device M may be fixed to the power receiver 32 by magnetic force.

The power storage unit 38 stores the electric power converted by the rectifier circuit 36. The power storage unit 38 includes a power storage battery (secondary battery) and is connected to the power supply unit 37. In this case, the electric power (stored power) stored in the power storage unit 38 can be supplied to the power supply unit 37, and thus can be supplied to the device M from the power supply unit 37.

As described above, the power receiver 32 is placed on the upper surface of the top plate portion 15b of the lower storage shelf 15. Therefore, the power receiver 32 can be lifted from the top of the top plate portion 15b and taken out from the recessed space 23. Accordingly, the power receiver 32 is a tray type capable of being taken out from the recessed space 23.

According to the configuration of the present embodiment described above in detail, the following excellent effects can be obtained.

The device arrangement portion (specifically, the upper surface of the power receiver 32) in which the device M which is a power supply target is disposed is provided in the recessed space 23 that is formed by being recessed with respect to the wall surface 18 of the entrance 11 and opened in the entrance 11. In this case, since it is not necessary to open or close the door or the like when disposing the device M in the device arrangement portion, it is possible to improve convenience in supplying electric power to the device M.

The electric power to be supplied to the device M disposed in the device arrangement portion is transmitted as microwaves from the power transmitter 31. The power transmitter 31 is disposed on the peripheral portion of the recessed space 23, and the transmission direction of the microwave is set to the direction intersecting the depth direction of the recessed space 23. In this case, the microwaves transmitted from the power transmitter 31 can be suppressed from leaking to the entrance 11 through the open portion of the recessed space 23. Accordingly, it is possible to suppress the leakage of the microwaves to the entrance 11 while improving convenience in supplying the electric power to the device M by the microwave power transmission in the building 10.

The microwaves transmitted from the power transmitter 31 are received by the power receiver 32. Then, the received microwaves are converted into electric power by the power receiver 32 and supplied to the device M. In this case, it is possible to supply electric power to the device M even if the device M which is a power supply target does not include a power receiving unit that receives microwaves. Therefore, a highly versatile power supply system can be obtained.

The power transmitter 31 and the power receiver 32 are disposed to face each other in the upper-lower direction with the power transmitter 31 as an upper side and the power receiver 32 as a lower side, and the upper surface of the power receiver 32 serves as the device arrangement portion on which the device M is placed. Further, the power receiver 32 includes the power supply unit 37 that supplies electric power to the device M placed on the upper surface of the power receiver 32 in a non-contact power supply manner. In this case, the electric power can be supplied to the device M only by placing the device M on the upper surface of the power receiver 32. Therefore, it is possible to further improve convenience when the electric power is supplied to the device M. Further, since wireless power supply can be realized, an outlet is not required, and it is possible to improve the appearance of the periphery of the recessed space 23.

The power receiver 32 includes the power storage unit 38 that stores the electric power converted from the microwaves, and the power receiver 32 is provided so as to be able to be taken out from the recessed space 23. In this case, the power receiver 32 is taken out from the recessed space 23, and the electric power stored in the power storage unit 38 can be supplied to the device M at a take-out destination. Accordingly, the electric power can be supplied to the device M while the device M is kept at hand, and thus the convenience can be further improved.

Since the lower surface of the recessed space 23 is located above the floor surface of the entrance 11, and the upper surface of the recessed space 23 is located below the ceiling surface of the entrance 11, an upper-lower dimension of the recessed space 23 is reduced. In this case, an upper-lower distance between the power transmitter 31 provided on the upper surface of the recessed space 23 and the power receiver 32 provided on the lower surface of the recessed space 23 can be shortened. Therefore, the transmission amount of microwaves transmitted from the power transmitter 31 to the power receiver 32 can be increased, and thus the transmission amount to the device M can be increased.

The transmission direction of the microwaves transmitted from the power transmitter 31 is a direction toward the back side of the recessed space 23 as the transmission direction approaches a transmission destination side. Accordingly, it is possible to further suppress the leakage of the microwaves from the open portion of the recessed space 23 to the entrance 11.

From the viewpoint of electric power that can be supplied, as the microwaves, it is preferable to use a frequency band of 5.7 to 5.8 GHz or higher. Further, by setting the frequency to be higher than 24 GHz band or the like, it is possible to improve the straightness of the microwaves and further suppress the leakage of the microwaves to the entrance 11.

The present invention is not limited to the above-described embodiment, and may be implemented as follows, for example.

Figure 5A:
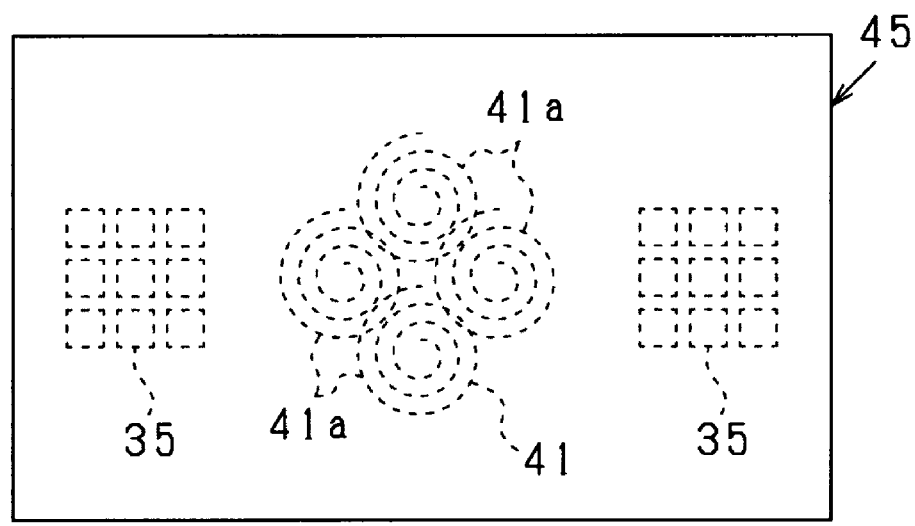
FIGS. 5A and 5B are plan views showing a power receiver according to another embodiment.

(1) The arrangement of the power supply unit 37 (power transmission coil) in the power receiver 32 is not limited to that in the above-described embodiment (see FIG. 4B). For example, the power supply unit may include a plurality of power transmission coils. In this case, as in a power receiver 45 shown in FIG. 5A, a plurality of (specifically, four) power transmission coils 41a provided in a power supply unit 41 may be disposed close to each other, or as in a power receiver 46 shown in FIG. 5B, a plurality of (specifically, two) power transmission coils 42a provided in power supply units 42 may be disposed apart from each other. In such a configuration in which the power supply unit includes the plurality of power transmission coils, it is possible to obtain an advantage that electric power can be supplied by placing a plurality of devices M on the upper surface of the power receiver.

Figure 5B:
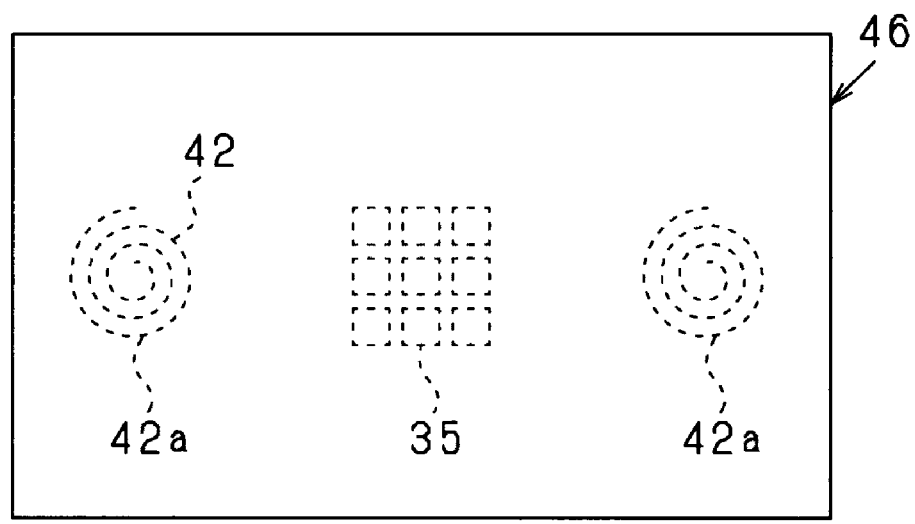

Further, the arrangement of the power receiving antennae 35 in the power receiver 32 may be changed from that of the above embodiment (see FIG. 4B). For example, as shown in FIG. 5B, only one power receiving antenna 35 may be provided in the power receiver 46. In the example of FIG. 5B, the power receiving antenna 35 is disposed at a central portion of the power receiver 32, and the plurality of power transmission coils 42a are disposed on both left and right sides of the power receiving antenna 35.

Figure 6:
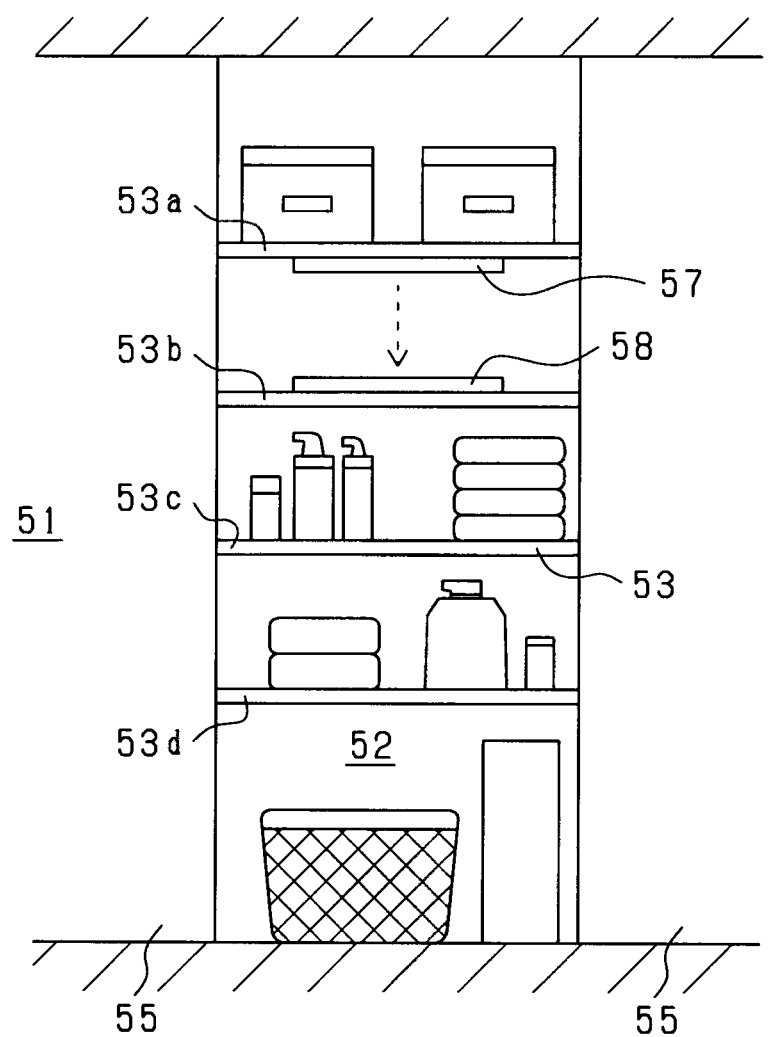
FIG. 6 is a front view showing an arrangement state of a power transmitter and a power receiver according to another embodiment.

(2) In the above embodiment, the recessed space 23 opened in the entrance 11 (corresponding to the living space) is used as a power supply space for supplying electric power to the device M, but a recessed space opened in a living space other than the entrance 11 may be used as the power supply space. For example, in an example shown in FIG. 6, a storage space 52 (corresponding to the recessed space) that is opened toward a living room 51 (corresponding to the living space) is used as the power supply space. The storage space 52 is a vertically elongated space that extends in the upper-lower direction and is formed by being recessed with respect to a wall surface 55 of the living room 51. Specifically, the storage space 52 extends over a height range from a floor surface to a ceiling surface of the living room 51. An opening and closing body such as a door is not provided in the open portion of the storage space 52, and thus the storage space 52 is always kept open.

A storage shelf 53 capable of storing articles is installed in the storage space 52. The storage shelf 53 has a plurality of upper and lower shelf plates 53a to 53d. Among the shelf plates 53a to 53d, the shelf plates 53a, 53b adjacent to each other in the upper-lower direction are provided with a power transmitter 57 and a power receiver 58, respectively. The power transmitter 57 is provided on a lower surface of the upper shelf plate 53a, and the power receiver 58 is provided on an upper surface of the lower shelf plate 53b. In this case, the power transmitter 57 and the power receiver 58 are disposed to face each other in the upper-lower direction, and the transmission direction of microwaves transmitted from the power transmitter 57 to the power receiver 58 is the upper-lower direction. That is, also in this case, since the transmission direction of the microwaves is a direction intersecting the depth direction of the storage space 52, it is possible to suppress the leakage of the microwaves to a living room 51 side. In this configuration, it is possible to supply electric power to the device M while storing the device M in the storage space 52. In the configuration described above, the power transmitter 57 and the power receiver 58 are disposed on an inner side of a peripheral portion of the storage space 52.

Figure 7:
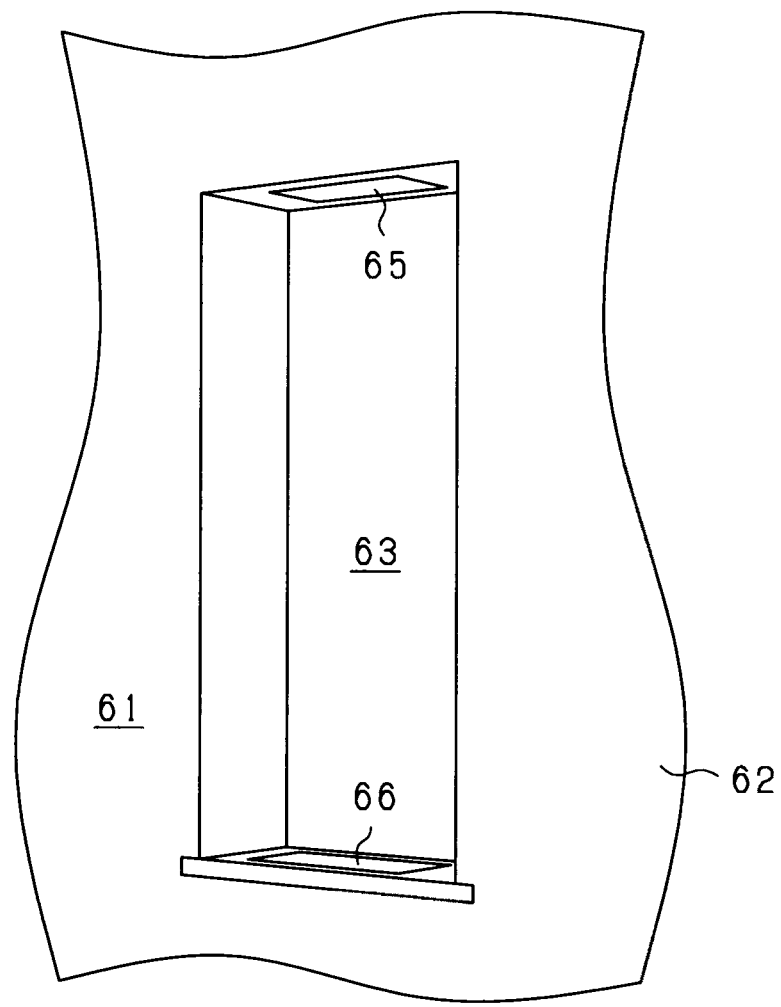
FIG. 7 is a perspective view showing an arrangement state of a power transmitter and a power receiver according to another embodiment.

(3) In the house shown in FIG. 7, a recessed space 63 is formed by being recessed with respect to a wall surface 62 of a living room 61. The recessed space 63 serves as a niche counter opened in the living room 61. Such a recessed space 63 may be used as the power supply space. A power transmitter 65 is provided on an upper surface of the recessed space 63, and a power receiver 66 is provided on a lower surface of the recessed space 63.

(4) In the above embodiment, the power transmitter 31 and the power receiver 32 are disposed to face each other in an upper-lower direction, but for example, the power transmitter 31 and the power receiver 32 may be disposed to face each other in a left-right direction (in other words, a width direction of the recessed space 23). In this case, the power transmitter 31 may be provided on a wall surface of the wall portion 21*a*, and the power receiver 32 may be provided on a wall surface of the wall portion 21*b*. In such a configuration, the transmission direction of microwaves transmitted from the power transmitter 31 to the power receiver 32 is the left-right direction. Therefore, also in this case, since the transmission direction of the microwaves is a direction intersecting the depth direction of the recessed space 23, it is possible to suppress the leakage of the microwaves to the entrance 11. In such a configuration, a magnet may be incorporated in the power receiver 32, and the device M may be fixed to the power receiver 32 by magnetic force.

(5) In the above embodiment, the power receiver 32 can be taken out from the recessed space 23, but the power receiver 32 may not be taken out from the recessed space 23 by fixing the power receiver 32 on the top plate portion 15*b* of the lower storage shelf 15 or the like.

(6) The device M to which electric power is supplied (non-contact power supply) from the power supply unit 37 of the power receiver 32 is not necessarily a portable device such as a smartphone, and may be a device other than the portable device, such as a timepiece, a digital camera, or a remote controller. Electric power can be supplied to a device having a built-in power reception coil.

(7) A method for supplying electric power from the power receiver 32 to the device M is not limited to non-contact power supply. For example, a wiring portion to which the device M can be connected may be provided in the power receiver 32, and electric power may be supplied from the power receiver 32 to the device M via the wiring portion in a state where the device M is connected to the wiring portion. In this case, even if the device M does not include the power reception coil, electric power can be supplied to the device M.

(8) When the device M which is a power supply target includes a power receiving unit capable of receiving microwaves, the power receiver 32 may not be provided. In this case, it is conceivable to set the device arrangement portion on which the device M is disposed (placed) on an upper surface of the top plate portion 15*b* of the lower storage shelf 15 (that is, a lower surface of the recessed space 23). In such a configuration, the microwaves transmitted from the power transmitter 31 are received by the power receiving unit of the device M placed on the device arrangement portion, and the received microwaves are converted into electric power inside the device M. Therefore, even if the power receiver 32 is not provided, electric power can be supplied to the device M.

(9) In the present embodiment, the device power supply system of the present invention is provided in a house, but the device power supply system of the present invention may be provided in a building other than the house, such as a school, a hospital, or a public facility.

What is claimed is:

1. A device power supply system that is applied to a building including a recessed space that is formed to be recessed with respect to a wall surface of a living space and is opened toward the living space and is for supplying electric power to a device, the device power supply system comprising:
    a device arrangement portion that is provided in the recessed space and on which the device is to be disposed;
    a power transmitter configured to transmit electric power to be supplied to the device disposed on the device arrangement portion as microwaves, wherein the power transmitter is disposed on a peripheral portion of the recessed space or at an inner side of the peripheral portion, and a transmission direction of the microwaves is set to a direction intersecting a depth direction of the recessed space; and
    a power receiver disposed on the peripheral portion of the recessed space or at the inner side of the peripheral portion, and configured to receive microwaves transmitted from the power transmitter, wherein
    the power receiver has a function of converting the microwaves which are received into electric power and supplying the electric power to the device,
    the power transmitter and the power receiver are disposed to face each other in an upper-lower direction with the power transmitter as an upper side and the power receiver as a lower side,
    an upper surface of the power receiver serves as the device arrangement portion on which the device is placed, and
    the power receiver includes a power supplier configured to supply electric power to the device placed on the upper surface by non-contact power supply.

2. The device power supply system according to claim 1, wherein
    the power receiver includes a power storage configured to store electric power converted from the microwaves,
    the power supplier is capable of supplying the electric power stored in the power storage to the device, and
    the power receiver is provided so as to be able to be taken out from the recessed space.

3. The device power supply system according to claim 1, wherein
    the power transmitter is provided on an upper surface of the recessed space,
    the power receiver is provided on a lower surface of the recessed space,
    the lower surface of the recessed space is located above a floor surface of the living space, and
    the upper surface of the recessed space is located below a ceiling surface of the living space.

4. The device power supply system according to claim 2, wherein
    the power transmitter is provided on an upper surface of the recessed space,
    the power receiver is provided on a lower surface of the recessed space,
    the lower surface of the recessed space is located above a floor surface of the living space, and
    the upper surface of the recessed space is located below a ceiling surface of the living space.

5. The device power supply system according to claim 1, wherein
the transmission direction of the microwaves transmitted from the power transmitter is a direction toward a back side of the recessed space as the transmission direction approaches a transmission destination side.

6. The device power supply system according to claim 2, wherein
the transmission direction of the microwaves transmitted from the power transmitter is a direction toward a back side of the recessed space as the transmission direction approaches a transmission destination side.

7. The device power supply system according to claim 3, wherein
the transmission direction of the microwaves transmitted from the power transmitter is a direction toward a back side of the recessed space as the transmission direction approaches a transmission destination side.

8. The device power supply system according to claim 4, wherein
the transmission direction of the microwaves transmitted from the power transmitter is a direction toward a back side of the recessed space as the transmission direction approaches a transmission destination side.

9. The device power supply system according to claim 1, wherein the recessed space is defined by side walls including a top side wall, a bottom side wall, a left side wall, a right side wall, and a back side wall, and having a front side which is open to the living space, the power transmitter is disposed on the top side wall, the power receiver is disposed on the bottom side wall.

10. The device power supply system according to claim 1, wherein the power transmitter is mounted in a fixed relationship face-to-face with the power receiver in the upper-lower direction.

11. The device power supply system according to claim 1, wherein the power receiver is configured to magnetically fix the device placed on the upper surface above the power receiver by magnetic force.

12. The device power supply system according to claim 1, wherein the power receiver is configured to perform non-contact power supply from a power transmission coil to the device.

13. The device power supply system according to claim 1, wherein the power receiver is separate from the device, has a flat plate shape and is adapted to be placed on a lower surface of the recessed space.

14. The device power supply system according to claim 13, wherein the power transmitter has a flat plate shape and is adapted to be attached to the recessed space.

* * * * *